US009447697B2

(12) United States Patent
Markyvech et al.

(10) Patent No.: US 9,447,697 B2
(45) Date of Patent: Sep. 20, 2016

(54) WASTEGATE VALVE AND TURBOCHARGER HAVING SAME

(71) Applicants: Craig Markyvech, Romulus, MI (US); James Miller, Ortonville, MI (US); David Fletcher, Flint, MI (US); Brian Graichen, Royal Oak, MI (US)

(72) Inventors: Craig Markyvech, Romulus, MI (US); James Miller, Ortonville, MI (US); David Fletcher, Flint, MI (US); Brian Graichen, Royal Oak, MI (US)

(73) Assignee: DAYCO IP HOLDINGS, LLC, Troy, MI (US)

( * ) Notice: Subject to any disclaimer, the term of this patent is extended or adjusted under 35 U.S.C. 154(b) by 720 days.

(21) Appl. No.: 13/838,006

(22) Filed: Mar. 15, 2013

(65) Prior Publication Data
US 2014/0271138 A1 Sep. 18, 2014

(51) Int. Cl.
*F02D 23/00* (2006.01)
*F01D 17/10* (2006.01)
*F04D 27/02* (2006.01)

(52) U.S. Cl.
CPC ......... *F01D 17/105* (2013.01); *F04D 27/0215* (2013.01); *F05D 2220/40* (2013.01); *F05D 2240/55* (2013.01); *F05D 2250/312* (2013.01)

(58) Field of Classification Search
CPC ............. F04D 27/0215; F01D 17/105; F05D 2250/312; F05D 2240/55; F05D 2220/40
USPC ......................................... 415/118, 145, 150
See application file for complete search history.

(56) References Cited

U.S. PATENT DOCUMENTS

| 4,245,953 A | 1/1981 | Milton et al. |
| 4,270,356 A | 6/1981 | Will et al. |
| 4,283,912 A | 8/1981 | Cholvin |
| 4,530,640 A * | 7/1985 | MacInnes ............... F01D 9/026 415/144 |
| 4,655,040 A | 4/1987 | Parker |
| 6,976,359 B2 | 12/2005 | Hastings et al. |

(Continued)

FOREIGN PATENT DOCUMENTS

| DE | 102009057161 A1 * | 6/2011 | ............. F02B 37/18 |
| WO | 2012/016311 | 2/2012 | |

OTHER PUBLICATIONS

APS. APS Intercooled Twin Turbo System Installation Guide—APSGTO-TTS/04. APS Automotive PTY LTD. Sep. 5, 2007. [retrieved on Jun. 5, 2014]. [Retrieved from internet: https://web.archive.org/web/*/http://www.airpowersystems.com/gto/install/apsgto-its04_guide.htm>.

(Continued)

*Primary Examiner* — Nicholas J Weiss
*Assistant Examiner* — Jason T Newton
(74) *Attorney, Agent, or Firm* — Thompson Hine LLP

(57) ABSTRACT

Wastegate assemblies and turbocharger assemblies including the wastegate assemblies are described. The wastegate assemblies include a housing enclosing both an actuator and a valve. The valve is operatively coupled to the actuator and the housing terminates with a crush seal. The housing also includes a mounting member connectable to a turbocharger to place the crush seal in sealing engagement with a wastegate opening in the turbocharger. The turbocharger assemblies include a housing enclosing a turbine and a compressor wheel that are operatively coupled together on a common shaft that defines an axis of rotation, and have a wastegate assembly removably mounted to an outlet end of the housing proximate the turbine and extending therefrom in a direction away from the turbine and the compressor wheel. Here, the wastegate assembly has a longitudinal axis that is parallel to the axis of rotation.

18 Claims, 3 Drawing Sheets

(56) References Cited

U.S. PATENT DOCUMENTS

| | | |
|---|---|---|
| 7,165,401 B2 | 1/2007 | McEwen et al. |
| 7,481,056 B2 | 1/2009 | Blaylock et al. |
| 7,677,040 B2 | 3/2010 | McEwan |
| 2009/0140730 A1* | 6/2009 | Newman ............ G01D 5/145 324/207.24 |
| 2009/0301180 A1* | 12/2009 | Reutiman ........ G01N 15/0656 73/114.71 |
| 2010/0037606 A1 | 2/2010 | Stilgenbauer et al. |
| 2010/0206309 A1 | 8/2010 | Han et al. |
| 2010/0206388 A1* | 8/2010 | Bielab ............... F16K 31/0644 137/12 |

OTHER PUBLICATIONS

PCT/International Search Report and Written Opinion, PCT/US2014/020657 (Jun. 23, 2014).

* cited by examiner

US 9,447,697 B2

WASTEGATE VALVE AND TURBOCHARGER HAVING SAME

TECHNICAL FIELD

This application relates to wastegate valves, more particularly to replaceable, self-calibrating wastegate valves of a turbocharger.

BACKGROUND

Turbochargers are well known devices for supplying air to the intake of an internal combustion engine at pressures above atmospheric (boost pressures). A conventional turbocharger, generally designed as reference 10 in FIG. 1, essentially comprises an exhaust gas driven turbine wheel 5 within a turbine section 2 mounted on a rotatable shaft within a turbine housing 4. For instance, in a centripetal turbine the turbine housing 4 defines an annular inlet passageway around the turbine wheel and a generally cylindrical axial outlet passageway 11 extending from the turbine wheel. Rotation of the turbine wheel rotates a compressor wheel mounted on the other end of the shaft within a compressor housing 6 of the compressor section 2. The compressor wheel delivers compressed air to the intake manifold of the engine, thereby increasing engine power.

Turbochargers incorporating wastegates are also well known, as illustrated in FIG. 1. A wastegated turbocharger has a bypass passageway between the exhaust inlet and exhaust outlet portions of the turbine housing to enable control of the turbocharger boost pressure. A wastegate valve assembly 13 is located in the passageway and is controlled to open the passageway when the pressure level of the boost air increases to a predetermined level, thus allowing some of the exhaust gas to bypass the turbine wheel preventing the boost pressure from rising further. The wastegate valve 13 is generally actuated by a pneumatic actuator 22 operated by boost air pressure delivered by the compressor wheel. The pneumatic actuator 22 may comprise a spring loaded diaphragm or sliding seal housed within a canister 24 (referred to as an actuator can) which is mounted to the compressor housing 6. The diaphragm seal acts on a connecting rod 26 which actuates the wastegate valve assembly 13. The actuator can 24 is connected to the compressor outlet via a hose to deliver boost air to the can which acts on the diaphragm (or sliding seal) to oppose the spring bias. The spring is selected, and the actuator and wastegate valve initially set, so that under low boost conditions the wastegate valve 13a remains closed. However, when the boost pressure reaches a predetermined maximum the diaphragm seal is moved against the action of the spring and operates to open the wastegate valve 13a (via the connecting actuator rod) thereby allowing some exhaust gas to bypass the turbine wheel.

In these types of conventional wastegate valves, the pressure at which the wastegate valve begins to open (the "lift off pressure") is critical to the operation thereof. Accordingly, the wastegate valve must be very carefully set when the pneumatic actuator 22 and wastegate valve assembly 13 are assembled to the turbocharger. The precise actuator can 24 pressure, at which the diaphragm begins to move, is dependent upon the preload of the spring used. Unfortunately, the variation in the manufacturing tolerances of springs means that variations in spring rate from one spring to the next is likely, and it is necessary to calibrate each turbocharger, individually, to determine the lift off pressure.

One method of carrying out the initial set up of the conventional actuator assembly described above, is a process known as "weld to set". The actuator can 24, actuating rod 26 and actuator lever 28 are pre-assembled, and mounted to the turbocharger 10. The wastegate valve 13a is then clamped shut from within the turbine housing 4 and the actuator can 24 is pressurized to the desired lift off pressure. With the diaphragm, actuator rod 26 and valve 13a thus held in their respective relative positions immediately prior to lift off, the end of the actuator lever is welded to the valve stem. Accordingly, any increase in the pressure supplied to the actuator above the predetermined lift off pressure will cause the valve 13a to open.

A known alternative to the above is to use an adjustable length actuator rod, typically comprising a threaded rod and rod end. The set point is achieved by adjusting the length of the rod, either by turning the rod end or a nut captured in the rod end assembly. Even using this method, it is still necessary to calibrate each turbocharger, individually, to determine the lift off pressure.

The assembly process and combined calibration process is very time intensive. Moreover, once assembled it is difficult to replace a faulty pneumatic actuator 22 and/or wastegate valve assembly 13. Conventional practice is to replace the entire turbocharger assembly, since they come pre-calibrated with an installed wastegate actuator 20 and wastegate valve assembly 13. This is an expensive replacement.

SUMMARY

Disclosed herein is a serviceable (i.e., replaceable), self-calibrating wastegate valve that is mountable directly on the turbine scroll of a turbocharger.

In one aspect, wastegate assemblies are disclosed that include a housing enclosing an actuator operatively connected to a valve, terminating in a crush seal, and having a mounting member connectable to a turbocharger to place the crush seal in sealing engagement with a wastegate opening in the turbocharger. The crush seal corrects for tolerance variations between at least the mounting member and a surface of the turbocharger to which the mounting member is mounted. The crush seal may also correct for tolerance variations between other components in the assembly that are stacked between the surface defining the wastegate opening and the mounting member of the wastegate assembly.

In another aspect, turbocharger assemblies are disclosed that include a housing enclosing a turbine and a compressor wheel operatively coupled together on a common shaft defining an axis of rotation and defining a wastegate opening in the portion housing the turbine, and a disposable wastegate assembly removably mounted directly to the wastegate opening, and having a valve for controlling the flow of exhaust gas from the wastegate opening to bypass the turbine.

In yet another aspect, turbocharger assemblies are disclosed that include a mounting plate, a turbocharger having the mounting plate connected to an outlet end of a turbine section, and a wastegate assembly having a valve therein mounted to the mounting plate. The mounting plate has a first opening and a second opening, and when mounted to the turbocharger the first opening is aligned with an axial outlet passage of the turbine section and the second opening is aligned with a wastegate opening. The mounting plate in this mounted position defines a passage connecting the wastegate opening to its second opening. The wastegate assembly is mounted thereto such that the valve is disposed in this passage to open and close the passage to control the flow of exhaust gas bypassing the turbine through the wastegate opening.

DETAILED DESCRIPTION

Figure 1:
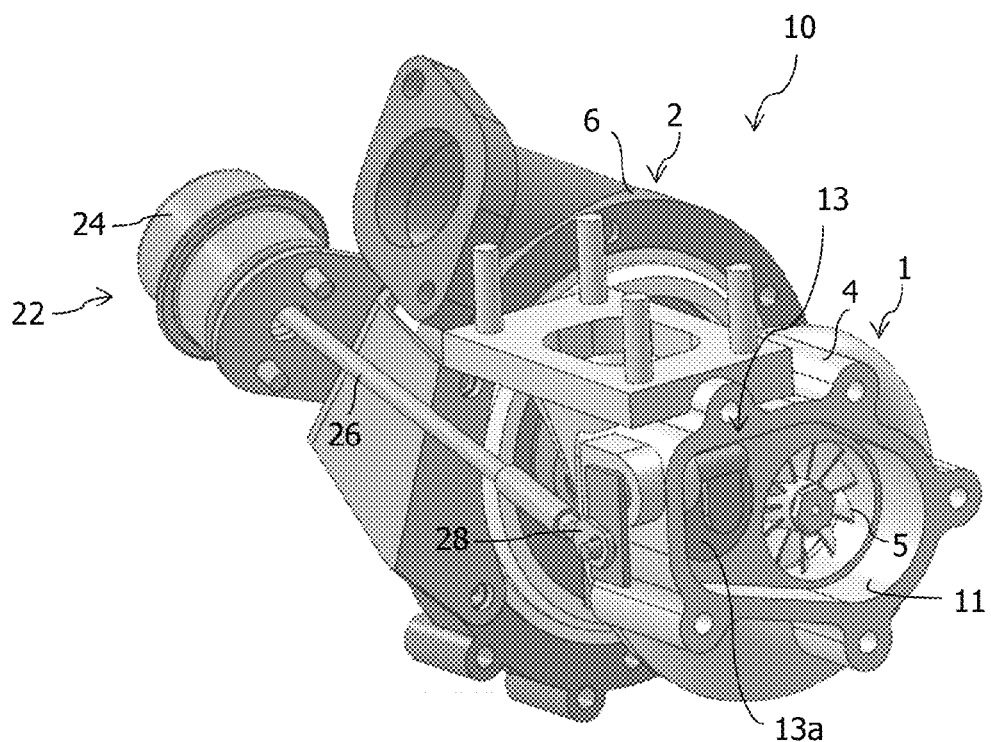
FIG. 1 is a side perspective view of one embodiment of a conventional turbocharger having a conventional diaphragm operated wastegate valve.

The following detailed description will illustrate the general principles of the invention, examples of which are additionally illustrated in the accompanying drawings. In the drawings, like reference numbers indicate identical or functionally similar elements.

An internal combustion engine turbo system typically includes the following components in controlling the operating parameters of a turbocharger—an exhaust-driven turbocharger with a turbine section and compressor section and a turbine bypass valve commonly referred to as a wastegate. The exhaust-driven turbocharger typically includes an exhaust housing containing a turbine wheel that harnesses and converts exhaust energy into mechanical work through a common shaft to turn a compressor wheel that ingests air, compresses it and feeds it at higher operating pressures into an inlet of an internal combustion engine. The wastegate is a control valve used to meter the exhaust volume coming from the exhaust manifold of the internal combustion engine and the energy available to power the exhaust-driven turbocharger turbine wheel. The wastegate works by opening a valve to a bypass so that exhaust flows away from the turbine wheel, thereby having direct control over the speed of the exhaust-driven turbocharger and the resultant operating pressure of the internal combustion engine intake manifold.

Figure 2:
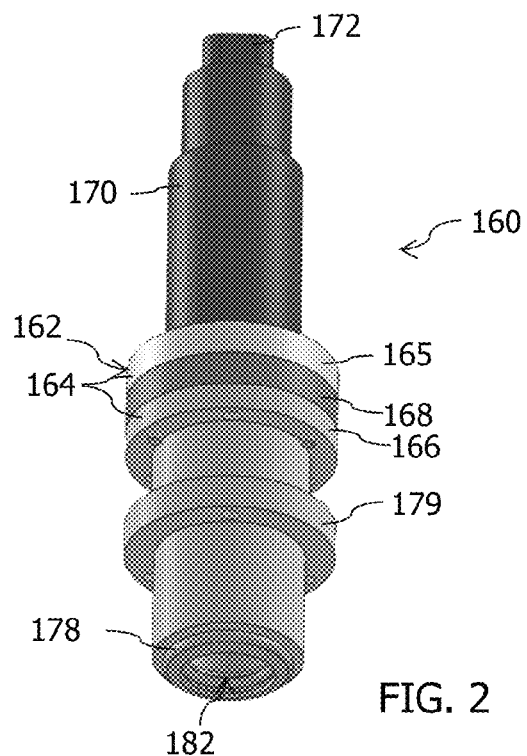
FIG. 2 is a perspective view of a pressure balanced wastegate assembly.

Referring now to FIG. 2, a wastegate assembly, generally designated as 160, includes a housing 162 comprising a cartridge body 164 divided into two sections, an actuator section 165 and a valve section 166, separated by a thermal insulator 168, which may also act as a seal between the two sections. The housing 162 also includes a cap 170, having an electrical connector 172 incorporated therein, covering a portion of the actuator section 165. Enclosed within the actuator section 165 is an actuator 174 (FIG. 3) that is operatively connected to a valve 176 housed within the valve section 166. The valve section 166 includes a mounting member 179 for connecting the wastegate assembly 160 to a turbocharger 100 and terminates with a crush seal 178. The importance of the crush seal is that being crushable allows tolerance variation between mounting surfaces such as mounting member 179 and mounting plate 230, and thereby outlet end 118 of housing 104. The mounting member 179 is disposed to place the crush seal 178 in sealing engagement with a wastegate opening 116 in the turbocharger 100 (see FIG. 3). The crush seal 178 may have any size, shape and configuration as long as it is crushable. In the illustrated embodiments, the crush seal 178 has an S-shaped cross-section, but is not limited thereto.

Figure 3:
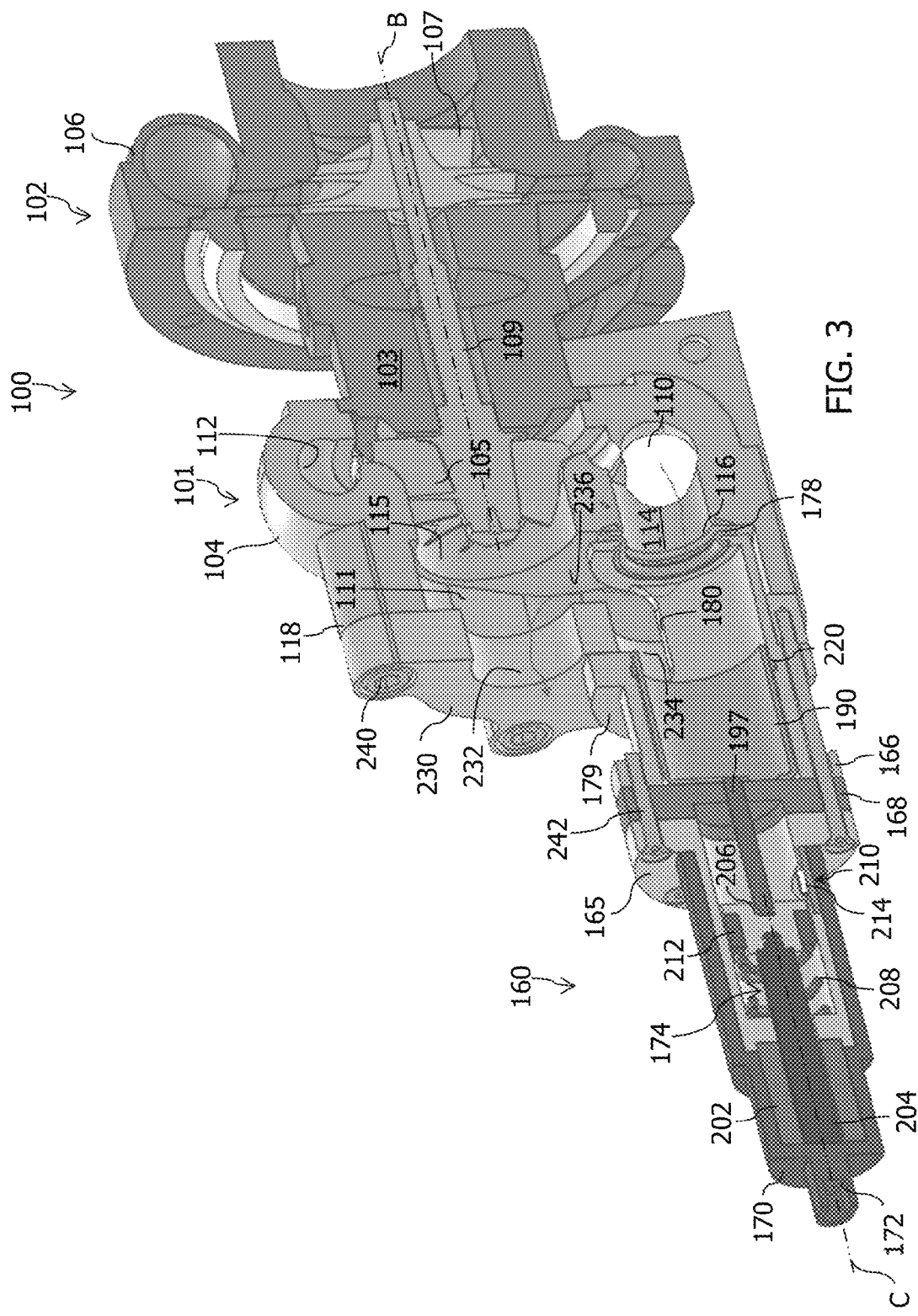
FIG. 3 is a longitudinal cross-sectional of the pressure balanced wastegate assembly of FIG. 2 mounted to the outlet passage end of a turbine section of a turbocharger.

As seen in FIG. 3, the housing 162 of the wastegate assembly 160, in particular the valve section 166, defines a window 180 disposed in operative relationship to the valve 176. In a closed position (FIG. 4) the valve 176 closes the window 180 and in an open position (FIG. 5), whether partial or full, the window 180 is in fluid communication with an inlet 182 in the valve section 166 of the housing 162.

The actuator 174 of the wastegate assembly 160 includes a solenoid 202, an armature 204, a connector 206 to connect the armature 204 to the rod 197 of the valve 176, a spring 208 seated on the connector 206 to bias the valve 176 toward a closed position (such shown in FIG. 4), and an electrical connector 172, electrically connectable to an external electrical device to operate the solenoid 202. The actuator 174 may also include a position sensor 210 to sense the position of a portion of the actuator 174, such as the connector 206 as shown in FIG. 3, which is relative to the position of the valve 176. The electrical connector 172 operatively, electrically connected to the solenoid 202 may also be electrically connected to the position sensor 210. The electrical connector 172 may be a plug or receptacle capable of receiving a cable (not shown) to connect the electrical connector 172 to an external device.

Figure 4:
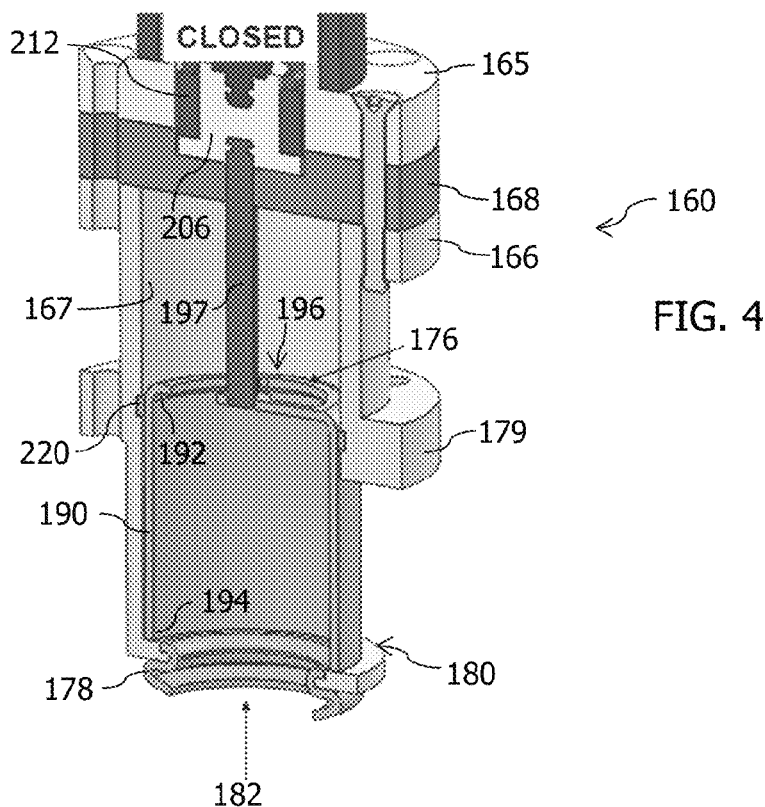
FIG. 4 is a longitudinal cross-sectional of the lower portion of the pressure balanced wastegate assembly of FIG. 2 in a closed position.
Figure 5:
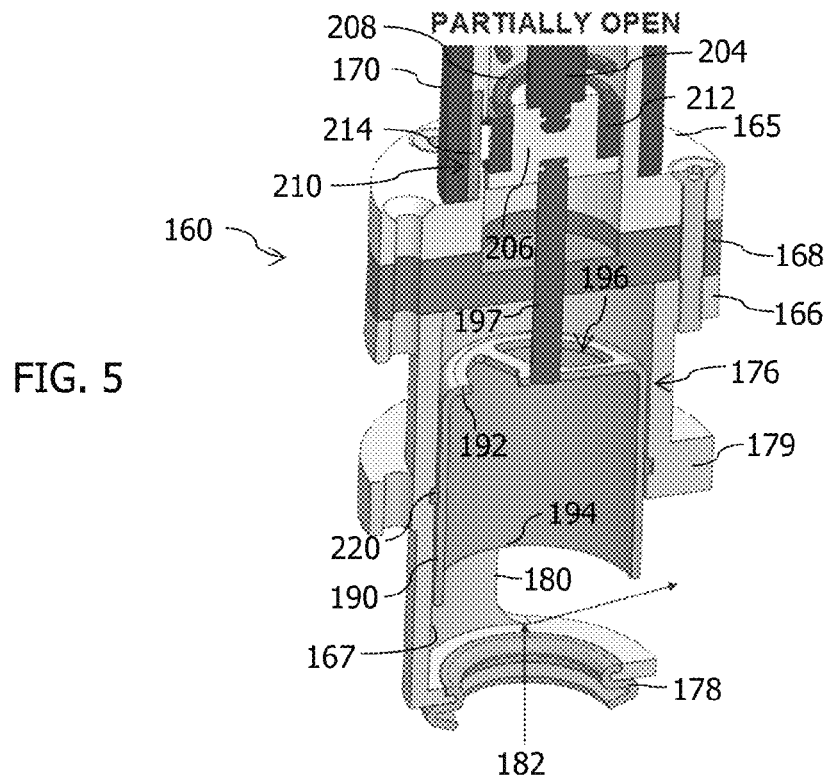
FIG. 5 is a longitudinal cross-sectional of the lower portion of the pressure balanced wastegate assembly of FIG. 2 in a partially open position.

The position sensor 210 may be any device that permits position measurement. The position sensor 210 may be a capacitive transducer, an eddy-current sensor, a grating sensor, a Hall effect sensor, an inductive non-contact position sensor, a laser Doppler Vibrometer (optical), a linear variable differential transformer (LVDT), a multi-axis displacement transducer, a photodiode array, a piezo-electric transducer (piezo-electric), a potentiometer, a proximity sensor (optical), a seismic displacement pick-up, a string potentiometer (also known as string pot, string encoder, cable position transducer), or a combination thereof. In the embodiment of FIGS. 3-5, the position sensor 210 is a relative position sensor (e.g., a displacement sensor) based on movement of a portion of the actuator 174 such as the connector 206. The relative position sensor, in one embodiment, is a Hall effect sensor comprising a magnet 212 moveable with the actuator 174 and a sensor chip 214 to sense the magnet's position and, accordingly, the displacement of the magnet 212. The magnet 212, as seen in FIGS. 3-5, is seated in the connector 206 for translation therewith, and may be an annular ring of material. Alternately, the magnet 212 may be mounted on the connector 206 or the armature 204. The chip 214 may be electrically connected to the electrical connector 172 to communicate the data gathered by the chip 214 to an external electronic device, such as a computer processing unit incorporated in or coupled to an internal combustion engine.

Referring to FIGS. 3-5, the valve 176 of the wastegate assembly 160 includes an elongate, cylindrical sleeve 190 having a partially closed first end 192 and an open second end 194. The partially closed end 192 is connected to a rod 197 that operatively connects the valve 176 to the actuator 174. The partially closed end 192 includes a grid 196 having a plurality of openings to balance the pressure within the valve as the sleeve 190 moves between the closed position and the open position.

As labeled in FIGS. 4 and 5, the valve 176 may also include a sealing member 220 positioned between the sleeve 190 and the inner wall 167 of the valve section 166 of the housing 162. The sealing member 220 may be disposed proximate a central position within the valve section 166, but is generally positioned proximate the partially closed end 192 of the sleeve 190 when the valve 176 is in the closed position (shown in FIG. 4) such that the elongate sleeve 190 contacts the sealing member 220 as the sleeve 190 moves from a closed position to an open position. The sealing member 220 may be an O-ring, a V-ring, or other annular seals made of sealing material for sealing engagement against another member of the valve 176.

Now turning to the turbocharger 100 connected to the wastegate 160 of FIG. 3, the basic components of the turbocharger 100 include a turbine section 101 joined to a compressor section 102 via a central bearing housing 103. The turbine section 101 comprises a turbine housing 104 which houses a turbine wheel 105. Similarly, the compressor 102 comprises a compressor housing 106 which houses a compressor wheel 107. The turbine wheel 105 and compressor wheel 107 are mounted on opposite ends of a common shaft 109 which is supported on bearing within the bearing housing 103.

The turbine housing 104 is provided with an exhaust gas inlet 110 and an exhaust gas outlet 111. The inlet 110 directs incoming exhaust gas to an annular inlet chamber 112, often referred to as a scroll, which forms a volute surrounding the turbine wheel 105. The exhaust gas flows through the turbine wheel 105 and into the exhaust gas outlet 111 via an outlet opening 115, which is coaxial with the turbine wheel 105.

The turbine housing 104 is provided with a bypass passageway 114, which communicates between the exhaust inlet 110 and the wastegate opening 116, which may be controllably fluidly connected to the exhaust gas outlet 111, for fluid communication therewith, and thus bypassing the turbine wheel 105. The controllable fluid connection of the bypass passageway 114 is controlled by the valve 176 of the wastegate assembly 160 described above to open and close the valve. As seen in FIG. 3, the open position of the valve 160 places the exhaust gas inlet 110 in fluid communication with the exhaust gas outlet 111 using the bypass passageway 114.

As seen in FIGS. 2-5, the wastegate assembly 160 is an elongate generally cylindrical device that has a longitudinal axis C. In the illustrated assembled state of FIG. 3, the longitudinal axis C of the wastegate assembly 160 is generally co-axial with the wastegate opening 116. In another embodiment, at least a portion of the wastegate assembly 160 is generally co-axial with the wastegate opening 116. In the assembled state of FIG. 3, based on the location of the wastegate opening 116 and the configuration of housing 104, the wastegate assembly 160 is removably mounted to the outlet end 118 of the housing 104 proximate the turbine 105 and extends therefrom in a direction away from the turbine 105 and away from the compressor wheel 107. Moreover, the wastegate assembly 160 has its longitudinal axis C parallel to the axis of rotation B defined by the common shaft 109 of the turbocharger 100. Each of these embodiments share a common configuration, in that the disposable wastegate assembly 160 is removably mounted directly to the wastegate opening 116 such that the valve 176 housed within the wastegate assembly 160 is positioned to control the flow of exhaust gas from the wastegate opening 116.

As described above, the wastegate assembly 160, in particular the inlet end of the valve section 166 thereof, terminates with a crush seal 178. In the assembly of FIG. 3, the crush seal 178 is permanently deformed, i.e., "crushed," against the wastegate opening 116 of the turbocharger 100 to form a sealed engagement between the wastegate assembly 160 and the turbocharger 100.

To facilitate the connection of the wastegate assembly 160 to the turbocharger 100, especially in a removable manner that enables the wastegate assembly 160 to by replaced without replacing the turbocharger, the turbocharger 100 includes a mounting plate 230 removably connected to the outlet end 118 of the turbine section 101 with one or more fasteners 240. The fasteners 240 may be screws, bolts, rivets, welds, or other known fasteners. The mounting plate 230 has a first opening 232 and a second opening 234 therethrough, and when mounted to the turbocharger 100 defines a chamber 236 therebetween that is in fluid communication with both the first and second openings 232, 234 and with the wastegate opening 116 and the exhaust gas outlet 111. When mounted, the first opening 232 of the mounting plate 230 is aligned with the exhaust gas outlet 111 of the turbine section 104 and the second opening 234 is aligned with the wastegate opening 116.

After the mounting plate 230 is connected to the turbocharger 100, the wastegate assembly 160 is removably mounted to the mounting plate 230 with the valve section 166 received in the second opening 234 thereof and with the crush seal 178 fixedly deformed into a sealing relationship with the wastegate opening 116. Alternately, the wastegate assembly 160 may be mounted to the mounting plate 230 and then, together as a unit, they are mounted to the turbocharger 100. In this assembly, the valve 176 of the valve section 166 is disposed within the chamber 236 to control the fluid communication between the wastegate opening 116, and hence exhaust gas inlet 110, and the first opening 232 in the mounting plate 230. The wastegate assembly 160 may be removably mounted to the mounting plate 230 through the mounting member 179 with one or more fasteners 242 (shown in FIG. 3). The fasteners 242 may be screws, bolts, rivets, welds, or other known fasteners.

Actuation of the wastegate valve 176 is achieved by sending an electric signal to the solenoid 202 to attract the armature 204 into the solenoid 202 to move the valve 176 into an open position (FIGS. 3 and 5). Then when the electric signal is removed from the solenoid 202, the spring 208 biases the valve 176 back into the closed position (FIG. 4). The solenoid 202 may be coupled to an external electronic device (not shown) that receives other data and/or electrical signals from other components of an internal combustion engine to determine when to activate and/or deactivate the solenoid. In one example, the external electronic device may deactivate the solenoid when a low boost condition is detected so that the bypass passage 114 is closed by the action of the spring 208 on the valve 176. However, once the pressure in the compressor outlet reaches a predetermined limit, the external electronic device activates the solenoid thereby opening the valve 176 to allow inlet exhaust gas to bypass the turbine 105. In this way, the maximum boost pressure produced by the turbocharger can be controlled and limited.

Here, the wastegate assembly 160 is significant improvement over prior conventional wastegates because it is replaceable without requiring replacement of the entire turbocharger and because it is self-calibrating. The inclusion of a position sensor within the actuator of the wastegate assembly provides the self-calibrating feature. Self-calibration can be performed after installation of the wastegate assembly at any time after installation. This eliminates the requirement for factory calibration at installation. Moreover, this design does not utilizes the convention flapper valve design which was internal to the scroll and not accessible if an error, wear, or failure occurred therein. This problem is eliminated by the disclosed wastegate assembly and turbocharger assembly.

Another advantage present in the wastegate assembly is that the valve is a pressure balanced valve, which requires less force to actuate. This advantage is provided by the partially open end 192 of the elongate sleeve 190 of the valve 176, best seen in FIGS. 4 and 5. Here, the surface area of both sides of the open end 192 are generally equal and as such, the exhaust gas flowing into the wastegate assembly 160, via inlet 182, applies equal force on both sides of the open end 192. Thus, the exhaust gas acts to push the piston up on the underside of the open end 192 (the side facing inlet 182) and acts to push the piston down on the upperside of the open end with equal force, which thus cancels out the forces. As such, the exhaust gas neither tends to hold the piston down or force it upward, thereby allowing the actuator 174 alone to control the movement of the valve.

Having described the invention in detail and by reference to preferred embodiments thereof, it will be apparent that modifications and variations are possible without departing from the scope of the invention which is defined in the appended claims.

What is claimed is:

1. A wastegate assembly for a turbocharger comprising:
    a housing enclosing an actuator operatively connected to a wastegate valve, the housing terminating in a crush seal at an end of the housing; and
    at least one mounting member connectable to a mounting surface of the turbocharger to place the crush seal in sealing engagement against a surface of the turbocharger defining a wastegate opening in the turbocharger; and
    wherein the wastegate valve includes an elongate, cylindrical sleeve having a partially closed first end distal the wastegate opening and an open second end proximate the wastegate opening;
    wherein the crush seal is permanently deformed by the sealing engagement and corrects for tolerance variations between at least the at least one mounting member and the mounting surface of the turbocharger.

2. The wastegate assembly of claim 1, wherein the housing defines a window disposed in operative relationship to the valve; wherein in a closed position the valve closes the window and in an open position, whether partial or full, the window is in fluid communication with an inlet of the housing.

3. The wastegate assembly of claim 1, wherein the partially closed first end is connected to a rod operatively connected to the actuator.

4. The wastegate assembly of claim 1, wherein the partially closed first end includes a grid having a plurality of openings.

5. The wastegate assembly of claim 1, wherein the actuator comprises a solenoid and an armature, and further comprises an electrical connector electrically connectable to an external electrical device.

6. The wastegate assembly of claim 5, wherein the actuator further comprising a spring having a biasing force to bias the valve toward the closed position.

7. The wastegate assembly of claim 5, further comprising a position sensor to sense the position of a portion of the actuator, which is relative to the position of the valve.

8. The wastegate assembly of claim 7, wherein the electrical connector is electrically connected to the position sensor.

9. The wastegate assembly of claim 1, wherein the housing includes a thermal insulator disposed between the actuator and the valve.

10. The wastegate assembly of claim 1, wherein the wastegate opening is in continuous fluid communication with the portion of the housing enclosing the wastegate valve.

11. A turbocharger assembly comprising:
    a housing enclosing a turbine and a compressor wheel operatively coupled together on a common shaft defining an axis of rotation and defining a wastegate opening in the portion housing the turbine; and
    a disposable wastegate assembly removably mounted directly to the wastegate opening, comprising:
    a wastegate valve for controlling the flow of exhaust gas from the wastegate opening;
    wherein the wastegate valve defines an open end seated proximate the wastegate opening and a partially open end opposite thereof, and
    wherein the disposable wastegate assembly terminates at a crush seal, the crush seal permanently and fixedly deformed against the wastegate opening by the disposable wastegate assembly to form a sealed engagement.

12. The turbocharger assembly of claim 11, wherein the crush seal includes an S-shaped cross-section.

13. The turbocharger assembly of claim 11, wherein the wastegate assembly further includes an actuator and a self-calibrating sensor.

14. The turbocharger assembly of claim 13, wherein the self-calibrating sensor includes a position sensor to sense the position of a portion of the actuator, which is relative to the position of the wastegate valve.

15. A turbocharger assembly comprising:
    a mounting plate having a first opening and a second opening therethrough;
    a turbocharger having the mounting plate connected to an outlet end of a turbine with the first opening aligned with an axial outlet passage of the turbine and the second opening aligned with a wastegate opening of the outlet end of the turbine;
    wherein the mounting plate and the turbocharger define a passage connecting the wastegate opening to the second opening; and
    a wastegate assembly housing a wastegate valve and terminating in a crush seal;
    wherein the wastegate assembly is mounted to the mounting plate with the wastegate valve disposed in the passage connecting the wastegate opening to the second opening of the mounting plate to open and close the passage, and the crush seal is permanently deformed against the turbine and surrounds the wastegate opening to form a sealed engagement.

16. The turbocharger assembly of claim 15, wherein the mounting plate is removably mounted to the turbocharger and the wastegate assembly is removably mounted to the mounting plate.

17. The turbocharger assembly of claim 15, wherein the wastegate assembly includes an actuator comprising a solenoid and an armature, and further comprises an electrical connector electrically connectable to an external electrical device.

18. The turbocharger assembly of claim 17, further comprising a position sensor to sense the position of a portion of the actuator, which is relative to the position of the wastegate valve.

* * * * *